United States Patent [19]
Takagi

[11] Patent Number: 6,099,221
[45] Date of Patent: Aug. 8, 2000

[54] CRUMBLING PREVENTION SHEET DEVICE

[75] Inventor: Yasuo Takagi, Gifu-ken, Japan

[73] Assignee: Kabushiki Kaisha Takagi Packs, Gifu-ken, Japan

[21] Appl. No.: 09/196,611

[22] Filed: Nov. 18, 1998

[30] Foreign Application Priority Data

Nov. 18, 1997 [JP] Japan .................................. 9-316894

[51] Int. Cl.$^7$ .................................................. B60P 7/06
[52] U.S. Cl. ............................... 410/97; 410/96; 410/100
[58] Field of Search ............................. 410/96, 97, 98, 410/100, 117, 118; 24/442, 16 R, 306; 206/597, 386; 53/399, 441, 461, 447; 108/22.1

[56] References Cited

U.S. PATENT DOCUMENTS

| | | | |
|---|---|---|---|
| 3,312,181 | 4/1967 | Davidson | 410/97 |
| 3,371,815 | 3/1968 | Mecomber | 206/597 |
| 3,947,927 | 4/1976 | Rosenthal | 24/16 R X |
| 4,868,955 | 9/1989 | Magnant et al. | 24/306 |
| 4,876,841 | 10/1989 | Jensen | 53/399 |
| 5,193,955 | 3/1993 | Chou | 410/100 |
| 5,479,681 | 1/1996 | Muraoka | 24/16 R |
| 5,582,337 | 12/1996 | McPherson et al. | 24/306 X |
| 5,603,591 | 2/1997 | McLellan | 410/97 |
| 5,784,761 | 7/1998 | Allen | 410/97 X |
| 5,972,464 | 10/1999 | Pezzuco | 206/597 |

*Primary Examiner*—Stephen T. Gordon
*Attorney, Agent, or Firm*—Jeffrey D. Myers

[57] ABSTRACT

A holder sheet device (100, 200) to securely hold boxes (50) together on a flatcar is disclosed, comprising at least one elongated sheet member (101, 102, 201), anchor belt (3, 23), and fastener (4, 24). Optionally, the holder sheet device is further provided with elastic connector (10). The anchor belt is spanned over the boxes and holds a portion of the holder sheet device so that a single worker can easily mount and set the holder sheet device on the boxes.

4 Claims, 3 Drawing Sheets

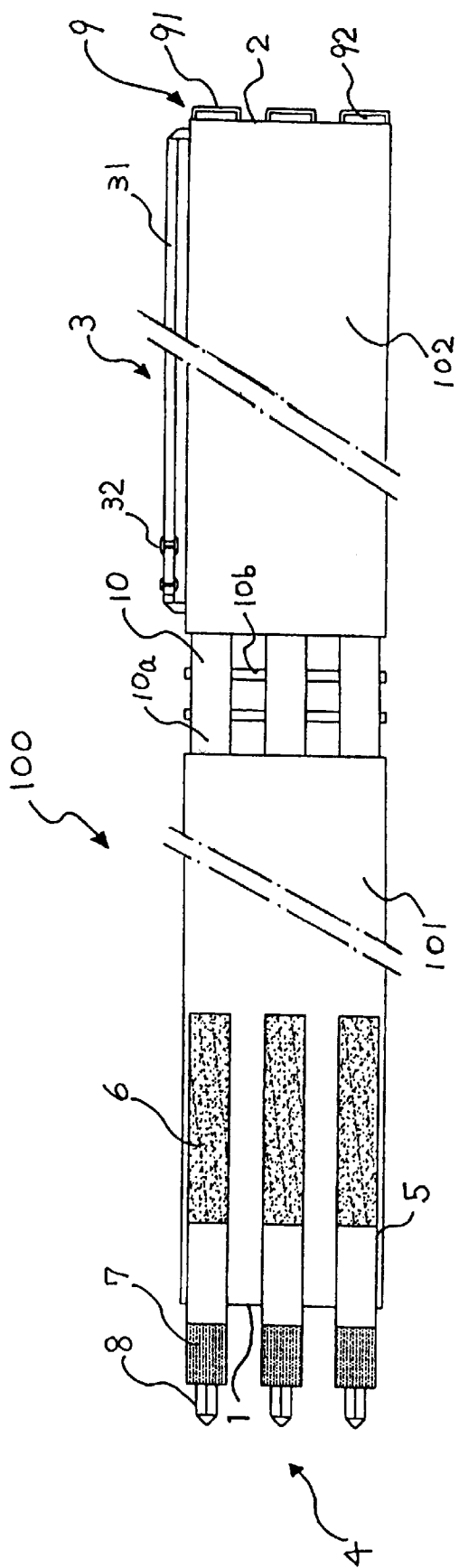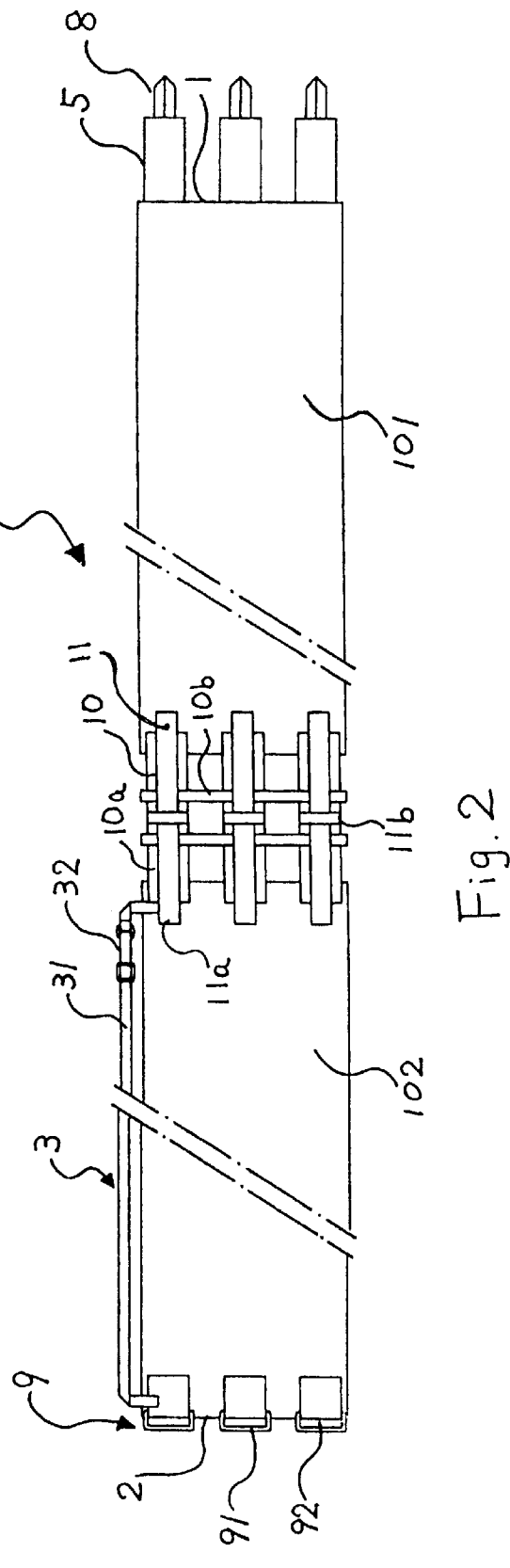

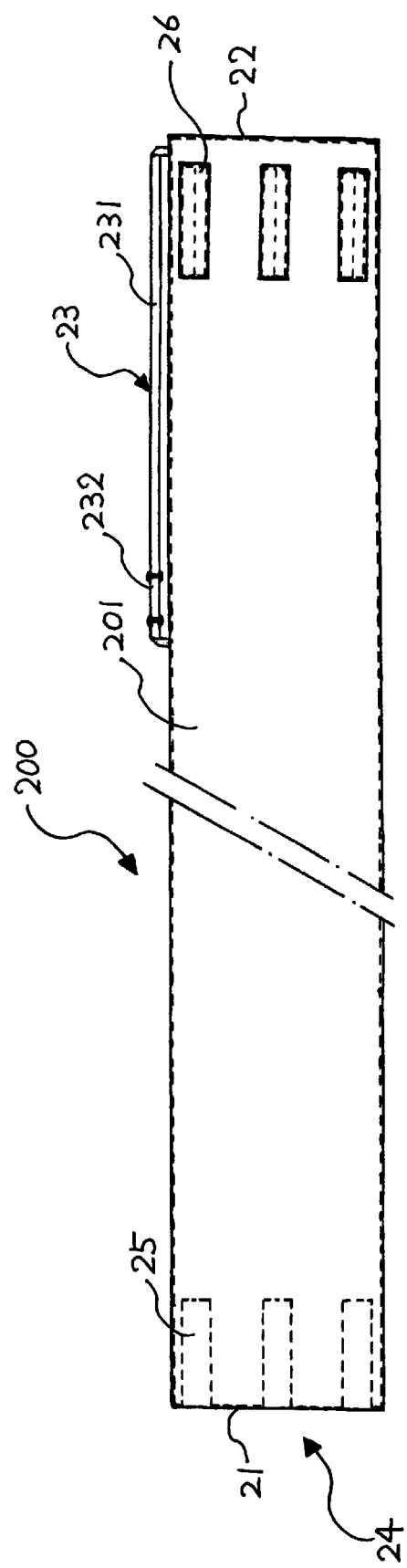

CRUMBLING PREVENTION SHEET DEVICE

BACKGROUND OF THE INVENTION

1. Field of the Invention

This invention generally relates to a load holder sheet device to prevent crumbling of piled boxes or sacks. More particularly, this invention relates to a load holder sheet device which can be easily handled and bound around boxes or sacks piled on a pallet or flatcar by a single worker to prevent crumbling of the boxes or sacks during transportation.

2. Prior Art

In order to improve work efficiency and reduce labor of transporting a large number of boxed or sacks within a limited compound, boxes or sacks are generally neatly piled as high as safely possible on a pallet or flatcar for transportation usually by forklift such that the boxes or sacks on the pallet or flatcar can be carried together in a lot, generally with due care not to crumble the piled load. However, boxes or sacks piled high on a pallet sometimes crumble during transportation. The contents of crumbled boxes or sacks are likely to be damaged. Crumbling boxes or sacks can injure workers and will adversely affect work efficiency.

To prevent such load crumbling, measures are conventionally taken. An elongated rectangular sheet having fastener means to fasten both vertical ends of the sheet may be bound around a load of boxes or sacks on a pallet to hold the boxes or sacks together. Such a sheet holder generally or at least conveniently requires two workers to wrap the sheet around piled boxes or sacks, one holding an end of the sheet and the other enclosing the piled sacks or boxes with the sheet.

While it is not impossible for a single worker to enclose sacks or boxes with such a sheet holder by first inserting an upper corner portion of the rectangular sheet under a sack or box such that the corner is held somehow in position by the weight of that sack or box while the worker turns around and encloses the sacks or boxes with the sheet, then comes back to that corner portion and fastens both ends of the sheet together with fastener means, the corner portion under that sack or box often comes off. The friction provided by such sheet corner insertion is often minimal and not large enough to hold that sheet portion.

Japanese Utility Model 3007683 discloses a holder belt to be bound around boxes or sacks piled on a pallet, whose ends are to be anchored to each other with hook-and-loop fasteners. The holder belt is "narrow" and use of a plurality of such belts is required to securely hold boxes or sacks piled high in layers on a pallet. Setting a plurality of such belts is time consuming.

A holder sheet may be provided at a corner with an elongated anchor device to be inserted under a box or bag to hold the corner of the sheet while the rest of the sheet is bound around piled boxes or sacks. However, such an anchor device can easily fall off when boxes or sacks are relatively light. On the other hand, when boxes or sacks are relatively heavy, insertion of such an anchor device by lifting a heavy box or sack may not be easily done. A stretch film of considerable length and width rolled out from a large film roll may be utilized to wrap boxes or sacks piled high on a pallet. Such a film can conventionally be wrapped around piled boxes or sacks with a wrapping machine. Such stretch films can not be reused and they are disposed after each use, which is a considerable waste of natural resources as well as hazardous to the environment. Disposed films are incinerated if not merely abandoned and produce harmful gaseous substances.

Accordingly, there exist a need and demand for a convenient and reusable load holder device which can be easily utilized by a single worker and during transportation can securely hold boxes or sacks piled high on a pallet or flatcar.

SUMMERY OF THE INVENTION

Accordingly, it is an object of the present invention to provide a reusable load corruption preventive sheet device which can be easily applied by a single worker around sacks or boxes piled high on a pallet or flatcar.

It is another object of the present invention to provide a reusable load corruption preventive sheet device which can be easily and securely fastened on a load of boxes or sacks piled on a pallet or flatcar to prevent crumbling of the load during transportation.

Those objects and other objects of the present invention can be attained by utilizing a reusable load corruption preventive sheet device provided according to the present invention.

The reusable load corruption preventive sheet device of the present invention is a holder sheet device comprising at least one elongated, generally rectangular, sheet member having a dimension large enough to fully wrap all (vertical) sides of a load on a pallet or flatcar. The sheet member or members may be a fabric of practically any appropriate natural or synthetic material.

The holder sheet device comprising two or more sheet members is provided with elastic connector means elastically connecting those sheet members so as to facilitate securer fastening of the holder sheet device on a load. Advantageously, stopper means is additionally provided on the elastic connector means to prevent excess stretching of the elastic connector means.

The holder sheet device further comprises fastener means to securely anchor the vertical ends of the holder sheet device on a load. The fastener means may be belt-and-buckle means or hook-and-loop fabric fastener means. The fastener means may alternatively be plastic or metal nail-and-hook means. Plastic or metal loop means may be additionally utilized to provide an easier and securer fastening of belt-type fastener means. Alternatively, this loop means may be slit means provided adjacent to a vertical end of the holder sheet device.

It is an important feature of the present invention that elongated anchor belt means is also provided partially along an elongated horizontal edge of the holder sheet device to be spanned over a load on a pallet or flatcar to securely hold a portion of the holder sheet device on the load during sheet mounting operation. Such anchor belt means may be stretchable or has size-adjusting means which may be belt-and-buckle means.

In use, the anchor belt means is simply spanned over a load on a pallet to hold a portion of the holder sheet device so that a single worker can grab a "free" end of the holder sheet device and walks around the load to fasten both vertical ends of the holder sheet device together on the load with the fastener means, which may have advantageously been hooked back by the loop means.

Thus, the present invention can provide a simple and secure transportation of a large number of boxes or sacks on a flatcar or pallet, greatly improving transportation work efficiency.

BRIEF DESCRIPTION OF THE DRAWINGS

The present invention will be more fully understood from the following detailed description when read together with the accompanying drawings, in which:

FIG. 1 is a front side view of a holder sheet device according to an embodiment of the present invention;

FIG. 2 is a rear side view of the holder sheet device of FIG. 1;

FIG. 5 is a front side view of a holder sheet device according to another embodiment of the present invention.

DETAILED DESCRIPTION OF PREFERRED EMBODIMENTS

Figure 3:
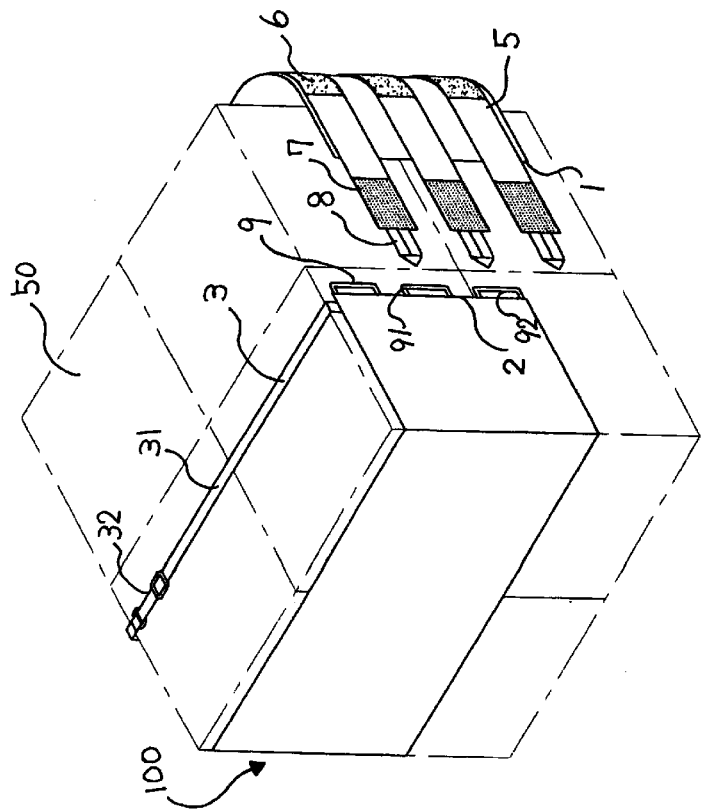
FIG. 3 is a perspective view showing an intermediate state of use of the holder sheet device of FIG. 1.

In FIG. 1 is shown a holder sheet device 100 according to an embodiment of the present invention, comprising two elongated sheet members 101 and 102 connected with elastic connector means 10 which is sewn or otherwise secured to the sheet members 101 and 102 as shown. The sheet members 101 and 102 are so dimensioned that they together with the elastic connector means 10 can substantially and vertically wrap a load of boxes or sacks piled on a pallet. In an example, the total length of the holder sheet device 100 is about 400 cm and the width is about 50 cm, which is substantially wider than conventional holder sheets.

The elastic connector means 10 in this embodiment comprises three horizontal stretch belts 10a and two vertical support belts 10b. These support belts 10b need not be stretchable. The stretch belt 10a may be made of rubber or any other stretchable material including a spring. The dimensions of the stretch belt 10a and support belts 10b can practically be any so long as they can provide their expected stretching function. In an example, each stretch belt 10a is about 350 cm×10 cm. Alternatively, such elastic connector means can be a single wide stretchable fabric sheet (not shown).

The elastic connector means 10 is advantageously provided with stretch stopper means 11 as shown in FIG. 2 to prevent excess stretching of the elastic connector means 10. The stopper means 11 in this embodiment comprises three unstretchable belts 11a respectively provided over the stretch belts 10a and respectively sewn or otherwise secured at both ends to the sheet members 101 and 102. Advantageously, those belts 11a are respectively held in place on the stretch belts 10a with belt holder means 11b as shown in FIG. 2.

The holder sheet device 100 further comprises fastener means 4 and loop means 9. The fastener means 4 in this embodiment is hook-and-loop fabric fastener means comprising three fastener belts 5 provided on a surface of the sheet member 101 in parallel adjacent to the left vertical end 1. Each fastener belt 5 having an elongated hook portion 6 and loop portion 7 is partially sewn or otherwise secured to the sheet member 101 (in this embodiment, only the hook portion 6 is sewn), partially outwardly extending from the end 1. The hook portion 6 and loop portion 7, which are advantageously separately provided on the fastener belt 5, can fixedly engage with each other when pressed onto each other. The hook portion 6 and loop portion 7 are of course interchangeable. Each fastener belt 5 should be long enough such that at least the hook portion (loop portion) 6 can be substantially long so that the loop portion (hook portion) 7 can be anchored on the portion 6 at varied locations to tightly fasten the device 100 on a load.

The loop means 9 in this embodiment comprises three generally rectangular loop devices 91 having an elongated opening 92 which are provided on the right vertical end 2 of the sheet member 102 as shown in FIG. 1 so as to correspondingly receive and hook the fastener belts 5 through their openings 92.

Each fastener belt 5 is provided on its outermost end a grip portion 8 to be grabbed and pulled by hand of a worker so as to facilitate convenient sheet mounting operation as well as easier insertion of the fastener belt 5 into the opening 92 of a corresponding loop device 91.

Figure 4:
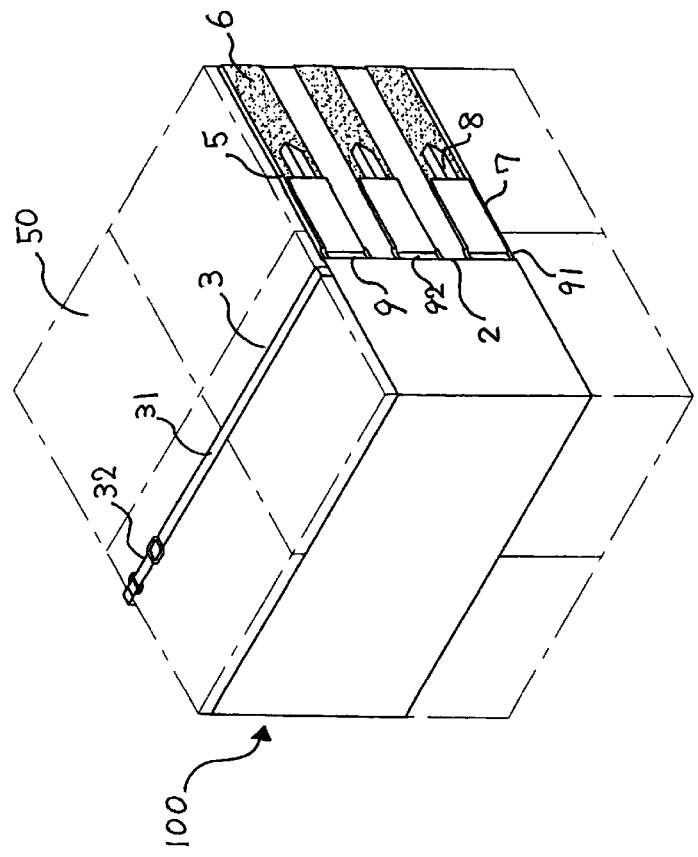
FIG. 4 is a perspective view showing the holder sheet device fastened around piled boxes.

An important feature of the present invention is elongated anchor belt means 3 comprising an elongated anchor belt 31, which is sewn or otherwise secured at both ends to the sheet member 102 in this embodiment. The anchor belt 31 should have a length substantially equal to or slightly longer than a side of a load on a pallet so as to span over the load 50 as shown in FIGS. 3 and 4. Alternatively, the anchor belt means 3 may be detachably provided on the holder sheet device 100 by appropriate attachment means. Advantageously, the anchor belt means 3 further comprises a size adjuster 32 as shown in FIG. 1, which may be belt-and-buckle means. Alternatively, the anchor belt 31 can be a stretchable belt of an appropriate stretchable material. Another such anchor belt means 3 may be additionally attached to the sheet member 101, if desired.

The anchor belt means 3 is spanned over piled boxes 50 as shown in FIG. 3 so that the sheet member 102 can be held on a vertical side portion of the boxes 50 while the sheet member 101 is wrapped around the remaining vertical side portion. The size of the anchor belt means 3 is appropriately adjusted by the size adjuster 32 so that the belt 31 can be tightly mounted on the boxes 50.

In FIG. 4 is shown a final state of the holder sheet device 100 as properly set on the boxes 50. The boxes 50 are very securely held together on a flatcar (not shown) and can be transported very securely. Removal of the holder sheet device 100 is also easy and simple. This holder sheet device 100 can be repeatedly used.

In FIG. 5 is shown a holder sheet device 200 according to another embodiment of the present invention, comprising an elongated sheet 201, fastener means 24 and elongated anchor belt means 23.

The fastener means 24 in this embodiment is hook-and-loop fabric fastener means comprising three parallel hook belt members 25 and three parallel loop belt members 26. The hook belt members 25 and loop belt members 26 are respectively sewn or otherwise fixed on different surfaces of the sheet 201 respectively adjacent to sheet ends 21 and 22 with appropriate intervals.

The hook belt members 25 and loop belt members 26 are interchangeable. The hook (loop) belt members 25 can correspondingly and fixedly engage the loop (hook) belt members 26 after the holder sheet 200 is bound around piled boxes or sacks (not shown). To provide secure fastening of the holder sheet device 200 on piled boxes, at least one of the hook belt member 25 and the loop belt member 26 should be substantially long such that the positional relationship of both ends 21 and 22 can be flexible when the holder sheet device 200 is applied on a load. Alternatively, though not shown, the fastener means 24 can be a "large" single hook or loop fabric (25) and a single "large" loop or hook fabric (26). In this embodiment, loop means 9 are not required.

An anchor means 23, which can be identical with the anchor means 3, is further provided, comprising an anchor belt 231 and a size adjuster 232. Utilization of this anchor means 23 is identical with the anchor means 3.

This holder sheet device 200 can be used substantially identically with the holder sheet device 100. When the holder sheet device 200 is wrapped around a load on a flatcar, the fastener members 25 and 26 are correspondingly and fixedly engaged to tightly hold the load.

The present invention has been described using embodiments. Those embodiments are provided only for illustration of the present invention and they should not be taken as limiting the scope of the invention. Modifications and changes to the embodiments may be made by those skilled in the art within the scope of the appended claims. All such modifications and changes should be construed as embraced in the scope of the present invention.

What is claimed is:

1. A holder sheet device comprising:

at least one elongated sheet member;

a fastener means to fasten together end portions of said holder sheet device; and an anchor belt wherein both ends of said anchor belt are attached to said at least one elongated sheet member; and wherein said at least one elongated sheet member comprises at least two sheet members, and said holder sheet device further comprises elastic connector means which elastically connects said at least two sheet members.

2. A holder sheet device according to claim 1, wherein said fastener means comprises hook-and-loop fabric fastener means.

3. A holder sheet device according to claim 2, wherein said hook-and-loop fabric fastener means comprises a plurality of fastener belts and a plurality of loop devices.

4. A holder sheet device according to claim 1 wherein said one end of said anchor belt is attached near an end of said at least one elongated sheet member.

* * * * *